2,831,874
Patented Apr. 22, 1958

2,831,874

IMPROVEMENTS IN THE PREPARATION OF 17:21-DIACYLOXY - 2:4 - DIBROMO -3:11:20 - TRIKETO-ALLOPREGNANES

Thomas Walker, South Harrow, Patrick Gadsden Jones, Hillingdon, and John Christopher Hamlet, Pinner, England, assignors to G. N. R. D. Patent Holdings Limited, London, England, a British company No Drawing. Application April 20, 1954
Serial No. 424,500

8 Claims. (Cl. 260—397.45)

This invention is concerned with improvements in or relating to the preparation of new steroid compounds, namely 17:21-diacyloxy-2:4-dibromo-3:11:20-triketoallopregnanes, which have the following general formula

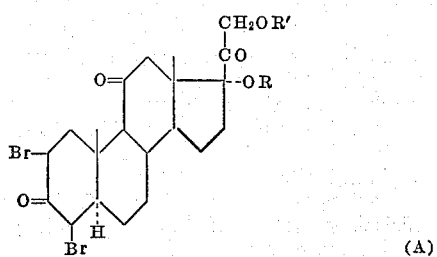

where R and R' are each an acyl radical preferably an alkylacyl radical containing from 1–4 carbon atoms or a benzoyl radical, R and R' may be the same or different.

A major difficulty in the synthesis of cortisone has been the establishment of the 3-keto-Δ⁴-system in the nucleus; it has been shown by Rosenkranz, Djerassi, Yashin and Pataki (Nature, 1951, 168, 28) that a compound similar to those of Formula A above, namely 21-acetoxy-2:4-dibromo-17-hydroxy-3:11:20-triketoallopregnane, can be converted to cortisone-21-acetate by reaction with sodium iodide followed by reduction of the resulting compound. No indication of the purity of the 21 - acetoxy-2:4-dibromo-17-hydroxy-3:11:20-triketoallopregnane obtained by the above authors was given or of the efficiency of its conversion to cortisone acetate and following their method as described in the literature we have been able to obtain yields of only 10–12% for the conversion of dihydroallocortisone to cortisone by this means. We have now found that using intermediates in which the 17-hydroxyl group is esterified, the corresponding 2:4-dibromo compounds are more readily isolated than the corresponding mono-esters of the said prior process which renders easier the obtaining of reasonable yields. The above compounds of formula A can be converted into the corresponding diester of cortisone with an equal, if not greater, degree of efficiency than is the case with the monoacetate already described by Rosenkranz et al. (loc. cit.). The above new compounds of Formula A are therefore valuable intermediates in the synthesis of cortisone in that they are generally more convenient than the corresponding 21-monoesters.

Accordingly the present invention comprises, as new compounds, compounds of the general formula

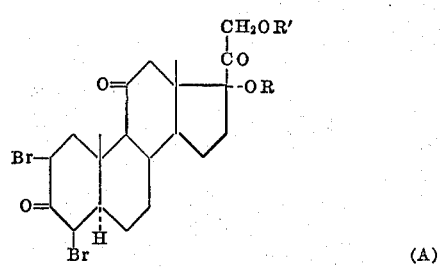

where R and R' have the above-stated meanings.

The invention specifically comprises the new compound in which R and R' are acetyl groups, namely 17:21-diacetoxy-2:4-dibromo-3:11:20-triketoallopregnane.

We will now give by way of example only, the characteristics of one of the new compounds according to the invention; it is to be understood that these characteristics were determined for the purest material we have been able to obtain and that they may be liable to variation dependent on the purity of any particular sample.

17:21-DIACETOXY-2:4-DIBROMO - 3:11:20 - TRIKETOALLOPREGNANE

M. P. 200° C. (decomp.)
$[\alpha]_D + 23.5°$ (CHCl₃)

The herein described new compounds can be prepared by the rearrangement of compounds of the general formula

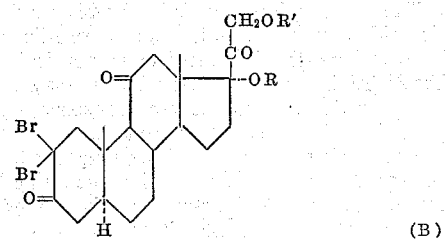

by means of hydrogen bromide in an inert organic solvent. The re-arrangement of 2:2-dibromo steroids to give 2:4-dibromo steroids has hitherto always been carried out as far as we can determine, in acetic acid. We find that it is on the contrary preferable to conduct the rearrangement of this invention in a non-polar organic solvent, such for example as chloroform, methylene chloride and ethyl bromide. We prefer to use alcohol-free chloroform.

The 2:2-dibromo compounds (B) above referred to may be obtained by the bromination of three types of compound represented by the following general Formulae 1, 2 and 3 using two, two and one molecular proportions of bromine respectively:

(1)
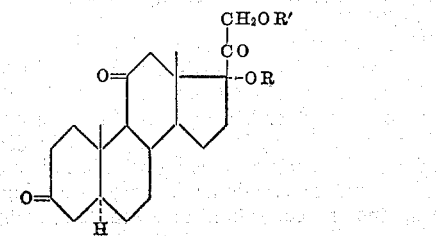

(2) 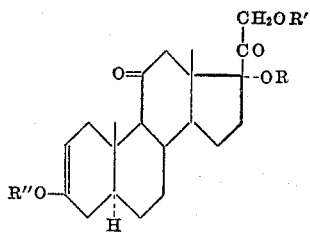

or (3) 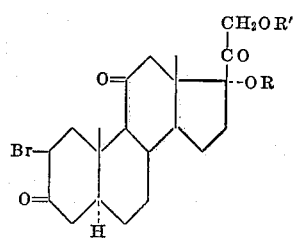

(In Formula 2 above R″ is an acyl group, preferably an alkylacyl group having from 1–4 carbon atoms, e. g. an acetyl group, or a benzoyl group.)

In these bromination reactions, hydrogen bromide is of course released with the result that the resultant intermediate 2:2-dibromo compound will tend to re-arrange spontaneously. In the case of compounds of types (2) and (3) the bromination can be carried out in the presence of an acid binding agent whereby the 2:2-dibromo intermediates can be isolated; in the case of compounds of type (1) such conditions do not result in bromination and we have been unable to isolate the 2:2-dibromo intermediate from compounds of type (1).

In fact the bromination of each of types (1), (2) and (3) proceeds more readily under acid conditions and we thus prefer to obtain the new 2:4-dibromo compounds by reacting compounds of types (1), (2) or (3) with bromine in the presence of added hydrogen bromide, without isolating the intermediate 2:2-dibromo compound.

The bromination stage is preferably carried out in acetic acid when the 2:2-dibromo intermediate is to be isolated; where the intermediate is not isolated both the bromination and the rearrangement may be carried out in a suitable non-polar solvent, for example, chloroform, methylene chloride or ethyl bromide.

The preferred manner of carrying out the process according to the invention varies according to which of three stated types of starting material is used. We prefer to carry out the process without isolation of the 2:2-dibromo intermediates using the type of starting material represented by Formula 1 above.

We will now describe the preferred methods of carrying out the process according to the invention.

(a) *Using compounds of Formula 1*

The starting material, that is the compounds of Formula 1, above, may be prepared in any convenient manner, for example by refluxing 21-acetoxy-17α-hydroxy-3:11:20-triketoallopregnane with a suitable acid anhydride of the formula $R_2O$, for example acetic anhydride in the case where R is an acetyl group.

The preferred proportions of bromine are from 1.8 to 2.2, advantageously 2.0 molecular equivalents. The bromination reaction is preferably carried out at from −50° to +50° C.

The re-arrangement of the intermediate 2:2-dibromo compound, whilst catalysed sufficiently by the hydrogen bromide produced in the reaction, is facilitated by the addition of further hydrogen bromide, for example about 5.0 mols. The hydrogen bromide is indeed preferably added at the commencement of the bromination.

The time of reaction will vary according to the solvent, the concentration and the temperature. It has however been found convenient under all circumstances to adopt the following procedure.

The first molecular equivalent of bromine is added rapidly, the reaction being almost instantaneous, but the second molecular equivalent is added portionwise the reaction mixture being allowed to decolourise in between each separate addition.

(b) *Using compounds of Formula 2*

The starting material, that is the compounds of Formula 2 above, may be prepared in any convenient manner, for example as described in Example 2a herein.

The preferred methods of carrying out the bromination and rearrangement are the same as those described under (a) above.

(c) *Using compounds of Formula 3*

The starting material may be prepared in any convenient manner, for example as described in Example 3a herein.

In this case the preferred proportions of bromine are from 0.9 to 1.1, advantageously 1.0 molecular equivalents. The other preferred conditions for the bromination and rearrangement are the same as those described under (a) and (b) above. The molecular equivalent of bromine, like the second molecular equivalent in the two previous cases, is preferably added portionwise, the reaction mixture being allowed to decolourise in between each separate addition.

As stated above we prefer to carry out the steps of bromination and re-arrangement without isolating the intermediate 2:2-dibromo compound; this intermediate can be isolated from compounds of type (2) and (3) provided, as already stated, steps are taken to prevent rearrangement of the intermediate by hydrogen bromide produced during its formation. Thus for example 17:21-diacyloxy-2-bromo-3:11:20-triketoallopregnane may be brominated with approximately one molecular proportion of bromine, for example at 70° C. in the presence of sufficient potassium acetate to react with all the hydrogen bromide evolved.

In order that the invention may be well understood the following examples are given only as illustrations.

(a) *Using compounds of Formula 1*

EXAMPLE 1

*Preparation of 17α:21-diacetoxy-2:4-dibromo-3:11:20-triketoallopregnane.*—A solution of bromine in dry alcohol-free chloroform (0.502 N; 44.6 ml.) was added rapidly to a solution of 17α:21-diacetoxy-3:11:20-triketoallopregnane (5.0 g.) in chloroform (10 ml.) and anhydrous hydrobromic acid in chloroform (0.48 N; 87.0 ml.). When addition was completed a further quantity of bromine in chloroform (0.502 N; 44.6 ml.) was added dropwise over 30 minutes. The solution was then washed with water, sodium bicarbonate solution, and water, dried over magnesium sulphate, and the solvent removed in vacuo at room temperature. Trituration of the residue in ether, and removal of the solvent in vacuo gave 17α:21-diacetoxy-2:4-dibromo-3:11:20-triketoallopregnane (6.8 g.; 100%) M. P. 181–3°, $[α]_D +25°$ (chloroform).

(b) *Using compounds of Formula 2*

EXAMPLE 2

(a) *Preparation of 3:17α:21-triacetoxy-11:20-diketopregn-2-ene.*—A solution of perchloric acid (50% aqueous; 0.125 ml.) in acetic anhydride (100 ml.) was added to a suspension of 21-acetoxy-17α-hydroxy-3:11:20-triketoallopregnane (50 g.) in dry benzene (800 ml.), and the mixture shaken at room temperature. All the solid went into solution in a few minutes, and after a total reaction time of ½ hour, the solution was washed with water, sodium bicarbonate solution and water. After drying over magnesium sulphate, the solvent was removed under reduced pressure and the resulting solid washed with ether (approx. 100 ml.). Removal of the solvent from the ether filtrate gave additional solid material which was washed with ether (10 ml.). The two solid fractions were combined to give 55.0 g. of 3:17α:21-triacetoxy - 11:20 - diketoallopregn - 2 - ene (91%) M. P. 169–173° [α]_D+45° (CHCl_3). Crystallisation from methanol gave the pure enol acetate M. P. 178–81° (sometimes also showing M. P. at 170–2°) [α]_D+46.8° (CHCl_3).

Found: C, 66.38; H, 7.49. $C_{27}H_{36}O_8$ requires C, 66.4; H, 7.4%.

(b) *Preparation of 17α:21 - diacetoxy - 2:4 - dibromo-3:11:20-triketoallopregnane.*—All the chloroform used in this example had been dried over calcium chloride for several days.

A solution of 11:20-diketo-3:17α:21-triacetoxyallopregn-2-ene (10 g.) in chloroform (10 ml.) and anhydrous hydrobromic acid in chloroform (0.6 N; 150 ml.) was stirred at room temperature while a solution of bromine in chloroform (0.455 N; 100 ml.) was added rapidly, the bromine colour disappearing almost instantaneously. When addition was completed a further solution of bromine in chloroform (0.455 N; 98 ml.) was added dropwise over ½ hour. When addition was complete, the mixture was stirred for a further 3 minutes, washed with water, sodium bicarbonate solution and again with water. After drying over anhydrous magnesium sulphate, the solvent was removed under reduced pressure at a temperature not exceeding 30°. On addition of a little ether the resulting gum completly solidified, and this solvent was again removed under reduced pressure to give the crude product, wt. 13.0 g., M. P. 180° (decomp.) [α]_D+32° (CHCl_3). Crystallisation from methylene chloride/ether gave pure 17α:21-diacetoxy-2:4-dibromo-3:11:20-triketoallopregnane M. P. 200° (decomp.) [α]_D+26.5° (CHCl_3). Found Br, 26.0. $C_{25}H_{32}O_7Br_2$ requires Br, 26.5%.

(c) *Using compounds of Formula 3*

EXAMPLE 3

(a) *Preparation of 2-bromo-17α:21-diacetoxy-3:11:20-triketoallopregnane.*—A solution of bromine in acetic acid (1.32 N; 76 ml.; 1.0 mol) was added all at once to a solution of 11:20-diketo-3:17α:21-triacetoxyallopregn 2-ene (24 g.) in acetic acid (100 ml.) at room temperature. The bromine colour disappeared almost immediately and the product crystallised out of solution. After standing for a further 15 minutes, the solid was filtered, washed with ether, and dried to give 2-bromo-17α:21-diacetoxy-3:11:20-triketoallopregnane (18.0 g.; 70%) M. P. 244–6° (decomp.) [α]_D+46.5° (chloroform). (Found: Br, 15.0. $C_{25}H_{22}O_7Br$ requires Br, 15.2%.)

(b) *Preparation of 17α:21-diacetoxy-2:2-dibromo-3:11:20-triketoallopregnane.*—A solution of 2-bromo-17α:21-diacetoxy-3:11:20-triketoallopregnane (10. g.) in dry acetic acid containing 2% potassium acetate (1500 ml.) was heated to 80°, and a solution of bromine in acetic acid (0.5 N; 99.0 ml.; 1.3 mol) added all at once. The mixture was kept at 80° for 40 minutes, when all the bromine colour had disappeared, then cooled and poured into water (7000 ml.). The resulting solid was filtered, the wet solid taken up in methylene chloride, the solution dried and the solvent removed in vacuo at room temperature. The residue was triturated with ethyl acetate (50 ml.) and the resulting solid filtered and dried in vacuo. Weight 7.88 g. (69%), M. P. 215–7° [α]_D+71.5° (chloroform). (Found: Br, 25.4. $C_{25}H_{32}O_7Br_2$ requires Br, 26.8%.)

Crystallisation from methylene chloride/ether gave pure 17α:21-diacetoxy-2:2-dibromo-3:11:20-triketoallopregnane, M. P. 216–7° [α]_D+72° (chloroform). (Found Br, 25.8. $C_{25}H_{32}O_7Br_2$ requires Br, 26.2%.)

(c) *Preparation of 17α:21 - diacetoxy - 2:4 - dibromo-3:11:20-triketoallopregnane.*—A solution of 17α:21-diacetoxy-2:2-dibromo-3:11:20-triketoallopregnane (2.0 g.) in dry alcohol-free chloroform (75 ml.) and anhydrous hydrobromic acid in chloroform (0.65 N; 26.0 ml.) was allowed to stand at room temperature 3 hours. The mixture was then washed with sodium bicarbonate solution and water, dried, and the solvent removed in vacuo at room temperature to give 17α:21-diacetoxy-2:4-dibromo-3:11:20-triketoallopregnane (1.99 g.), M. P. 200° [α]_D+26.2° (chloroform).

EXAMPLE 4

*Preparation of 17α:21-diacetoxy-2:4-dibromo-3:11:20-triketoallopregnane.*—A solution of bromine in dry alcohol-free chloroform (0.54 N; 7.45 ml.) was added over ¾ hour to a solution of 2-bromo-17α:21-diacetoxy-3:11:20-triketoallopregnane (1.0 g.) in chloroform (30 ml.) and a solution of anhydrous hydrobromic acid in chloroform (0.63 N; 10.5 ml.). When addition was completed, the mixture was washed with sodium bicarbonate solution and water, dried over magnesium sulphate, and the solvent removed in vacuo at room temperature to give crude 17α:21-diacetoxy-2:4-dibromo-3:11:20-triketoallopregnane (1,162 g.; 100%), M. P. 182–184°, [α]_D+29° (chloroform).

We claim:

1. The process of claim 5 in which said 2:2-dibromo compound is prepared by reacting a compound selected from the group consisting of

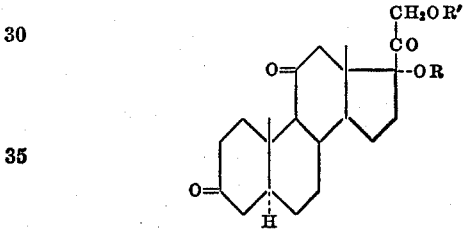

and

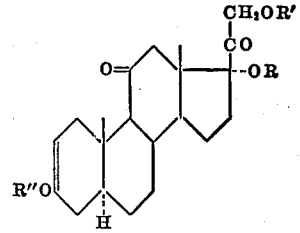

in which R, R′, and R″ are each organic groups selected from the group consisting of lower alkanoyl and benzoyl groups with approximately two molecular proportions of bromine in an inert organic solvent and said 2:2-dibromo compound is rearranged in situ to form said 2:4-dibromo compound.

2. A process as claimed in claim 1 in which R, R′ and R″ are each acetyl groups.

3. The process of claim 5 in which said 2:2-dibromo compound is prepared by reacting a compound having the general formula

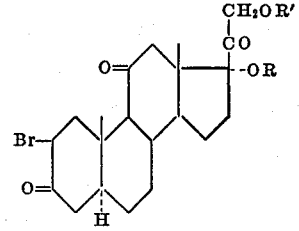

where R and R′ are each groups selected from the group consisting of lower alkanoyl and benzoyl groups with approximately one molecular proportion of bromine in an inert organic solvent and said 2:2-dibromo compound is rearranged in situ to form said 2:4-dibromo compound.

4. The process defined in claim 3 in which R and R' are each acetyl groups.

5. In a process for the preparation of compounds of the formula

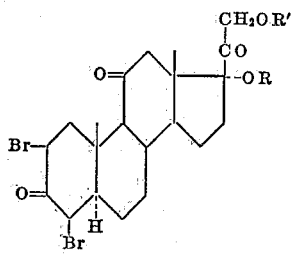

where R and R' are each organic groups selected from the group consisting of lower alkanoyl and benzoyl groups, the step of rearranging a 2:2-dibromo compound of the formula

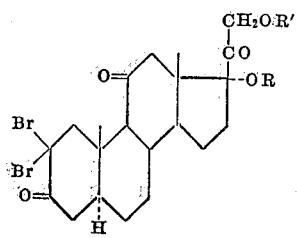

where R and R' are each organic groups selected from the group consisting of lower alkanoyl and benzoyl groups by treatment with hydrogen bromide in the presence of an inert organic solvent.

6. A process as claimed in claim 5 in which said solvent is a non-polar solvent.

7. A process as claimed in claim 5 in which said solvent is selected from the group consisting of chloroform, methylene chloride and ethyl bromide.

8. A process as claimed in claim 5 in which R and R' are each acetyl groups.

References Cited in the file of this patent

UNITED STATES PATENTS

| | | |
|---|---|---|
| 2,239,012 | Miescher | Apr. 22, 1941 |
| 2,365,292 | Ruzicka | Dec. 19, 1944 |
| 2,684,375 | Oliveto | July 20, 1954 |

FOREIGN PATENTS

| | | |
|---|---|---|
| 236,013 | Switzerland | May 16, 1945 |

OTHER REFERENCES

Rosenkranz et al.: Nature, 168, page 28 (1951).

Fieser et al.: Natural Products related to Phenanthrene, third edition (1949), page 264.